US00RE45645E

(19) United States
(12) Reissued Patent
Konoue et al.

(10) Patent Number: US RE45,645 E
(45) Date of Reissued Patent: Aug. 4, 2015

(54) MULTILAYER COIL COMPONENT AND METHOD FOR MANUFACTURING THE SAME

(71) Applicant: MURATA MANUFACTURING CO., LTD., Kyoto-fu (JP)

(72) Inventors: Masaharu Konoue, Tokyo-to (JP); Yukio Maeda, Shiga-ken (JP); Tatsuya Mizuno, Shiga-ken (JP); Hiroki Hashimoto, Shiga-ken (JP); Mitsuru Ueda, Shiga-ken (JP)

(73) Assignee: Murata Manufacturing Co., Ltd., Kyoto-fu (JP)

(21) Appl. No.: 13/973,827

(22) Filed: Aug. 22, 2013

Related U.S. Patent Documents

Reissue of:
(64) Patent No.: 8,004,383
Issued: Aug. 23, 2011
Appl. No.: 12/719,564
Filed: Mar. 8, 2010

U.S. Applications:
(63) Continuation of application No. PCT/JP2008/065029, filed on Aug. 22, 2008.

(30) Foreign Application Priority Data

Sep. 14, 2007 (JP) ..... 2007-238624

(51) Int. Cl.
*H01F 5/00* (2006.01)

(52) U.S. Cl.
CPC ..... *H01F 5/00* (2013.01)

(58) Field of Classification Search
USPC ..... 336/65, 83, 200, 232, 205–208, 336/233–234; 156/89.16–18
IPC ..... H01F 5/00,27/30, 27/02
See application file for complete search history.

(56) References Cited

U.S. PATENT DOCUMENTS 4,918,421 A * 4/1990 Lawless et al. ..... 338/21
6,855,222 B2 * 2/2005 Konoue et al. ..... 156/89.16

(Continued)

FOREIGN PATENT DOCUMENTS

JP 4-065807 3/1992
JP 6-083715 3/1994

(Continued)

OTHER PUBLICATIONS

International Search Report; PCT/JP2008/065029; Dec. 2, 2008.

(Continued)

*Primary Examiner* — Tuyen Nguyen
(74) *Attorney, Agent, or Firm* — Studebaker & Brackett PC

(57) ABSTRACT

A highly reliable multilayer coil component is provided without forming voids between magnetic ceramic layers and internal conductor layers. According to the multilayer coil component, an internal stress problem is reduced, the direct current resistance is low, and fracture of internal conductors caused by the surge or the like is not likely to occur. An acidic solution is allowed to permeate a magnetic ceramic element from a side surface thereof through a side gap portion which is a region between side portions of the internal conductors and the side surface of the magnetic ceramic element and to reach interfaces between the internal conductors and a magnetic ceramic located therearound. A pore area ratio of the magnetic ceramic of the side gap portion which is located between the side portions of the internal conductors and the side surface of the magnetic ceramic element is set in the range of 6% to 28%.

19 Claims, 5 Drawing Sheets

(56) References Cited

U.S. PATENT DOCUMENTS

| | | | | |
|---|---|---|---|---|
| 7,663,464 | B2 * | 2/2010 | Yamamoto et al. | 336/205 |
| 7,889,044 | B2 * | 2/2011 | Ueda et al. | 336/200 |
| 2004/0084131 | A1 | 5/2004 | Konoue et al. | |

FOREIGN PATENT DOCUMENTS

| | | | |
|---|---|---|---|
| JP | 6-096953 | | 4/1994 |
| JP | 8-083715 | | 3/1996 |
| JP | 11-154618 | | 6/1999 |
| JP | 11-307335 | | 11/1999 |
| JP | 2000-164455 | A | 6/2000 |
| JP | 2000-208316 | A | 7/2000 |
| JP | 2001-244116 | A | 9/2001 |
| JP | 2002-083708 | A | 3/2002 |
| JP | 2004-022798 | A | 1/2004 |
| JP | 2004-079941 | A | 3/2004 |
| JP | 2005-038904 | A | 2/2005 |
| JP | 2005-044819 | A | 2/2005 |
| JP | 2005-286353 | A | 10/2005 |
| JP | 2006-232647 | A | 9/2006 |
| KR | 10-2005-0088272 | A | 9/2005 |

OTHER PUBLICATIONS

The Office Action from the Chinese Intellectual Property Office dated Aug. 3, 2011; Chinese Patent Application No. 2008801079819.0.

Written Opinion of the International Searching Authority; PCT/JP2008/065029; Dec. 2, 2008.

International Search Report; PCT/JP2008/065029; Dec. 2, 2008. The Office Action from the Korean Intellectual Property Office dated Apr. 22, 2011; Korean Patent Application No. 2010-7002925 with English abstract of the Examination result.

* cited by examiner

MULTILAYER COIL COMPONENT AND METHOD FOR MANUFACTURING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

*Notice: More than one reissue application has been filed for the reissue U.S. Pat. No. 8,004,383. The reissue application numbers are Ser. No. 13/973,827 (the present reissue application) filed Aug. 22, 2013 and Ser. No. 14/553,613 filed Nov. 25, 2014 (a divisional reissue of U.S. application Ser. No. 13/973,827). The present application is a reissue application under 35 U.S.C. §251 of U.S. patent application Ser. No. 12/719,564, filed Mar. 8, 2010, now U.S. Pat. No. 8,004,383, issued Aug. 23, 2011.*

The present application is a continuation of International Application No. PCT/JP2008/065029, filed Aug. 22, 2008, which claims priority to Japanese Patent Application No. 2007-238624 filed Sep. 14, 2007, the entire contents of each of these applications being incorporated herein by reference in their entirety.

BACKGROUND OF THE INVENTION

1. Field of the Invention

The present invention relates to a multilayer coil component having the structure in which a magnetic ceramic element includes a spiral coil therein, the magnetic ceramic element being formed by firing a ceramic laminate in which coil-forming internal conductors primarily composed of Ag and magnetic ceramic layers are laminated to each other.

2. Description of the Related Art

In recent years, electronic components have been increasingly required to be miniaturized, and also as for coil components, a multilayer type has been becoming a mainstream.

Incidentally, in a multilayer coil component obtained by simultaneous firing of a magnetic ceramic and internal conductors, an internal stress generated by the difference in coefficient of thermal expansion between magnetic ceramic layers and internal conductor layers degrades magnetic characteristics of the magnetic ceramic and causes a problem in that the impedance value of the multilayer coil component decreases and/or fluctuates.

Accordingly, in order to solve the above problem, a multilayer impedance element has been proposed in which voids are formed between magnetic ceramic layers and internal conductor layers by a treatment to immerse a fired magnetic ceramic element in an acidic plating solution so as to avoid the influence of stress by the internal conductor layers to the magnetic ceramic layers and to overcome the decrease and/or fluctuation of the impedance value, as disclosed in Japanese Unexamined Patent Application Publication No. 2004-22798.

However, in the multilayer impedance element disclosed in Japanese Unexamined Patent Application Publication No. 2004-22798, since discontinuous voids are formed between the magnetic ceramic layers and the internal conductor layers by immersing the magnetic ceramic element in the plating solution so as to enable the plating solution to permeate the inside of the magnetic ceramic element through portions of the internal conductor layers which are exposed on the surfaces of the magnetic ceramic element, the internal conductor layers and the voids are formed between the magnetic ceramic layers, and the internal conductor layers are thinned, so that in practice, the ratio of the internal conductor layers present between the ceramic layers inevitably decreases.

Hence, a problem may arise in that a product having a low direct current resistance is difficult to obtain. In particular, in the case of a compact product, such as a product having dimensions of 1.0 mm, 0 5 mm, and 0.5 mm or a product having dimensions of 0.6 mm, 0.3 mm, and 0.3 mm, the thickness of each magnetic ceramic layer must be decreased, and internal conductor layers each having a large thickness are difficult to form while the internal conductor layers and the voids are both provided between the magnetic ceramic layers. Accordingly, the direct current resistance is not only decreased but also fracture of the internal conductors caused by the surge or the like is liable to occur, and as a result, a problem in that sufficient reliability cannot be ensured may occur.

SUMMARY OF THE INVENTION

The present invention has been conceived to solve the problems described above, and an object of the present invention is to provide a highly reliable multilayer coil component in which without forming voids as in the past between magnetic ceramic layers and internal conductor layers, both of which form a multilayer coil component, internal stresses disadvantageously generated between the magnetic ceramic layers and the internal conductor layers due to the differences in sintering shrinkage behavior and coefficient of thermal expansion therebetween can be reduced; the direct current resistance is low; and fracture of the internal conductors caused by the surge or the like is not likely to occur.

In order to achieve the above object, in an embodiment of the present invention, a multilayer coil component includes: a magnetic ceramic element formed by firing a ceramic laminate which is formed by laminating magnetic ceramic layers to each other and which includes coil-forming internal conductors primarily composed of Ag. The internal conductors are interlayer-connected to each other to form a spiral coil. No voids are present at interfaces between the internal conductors and a magnetic ceramic located therearound. The internal conductors are separated from the magnetic ceramic at the interfaces therebetween.

In the multilayer coil component of the present invention, in a side gap portion between side portions of the internal conductors and a corresponding side surface of the magnetic ceramic element, a pore area ratio of the magnetic ceramic is preferably set in the range of 6% to 20%.

The pore area ratio of the magnetic ceramic of the side gap portion is preferably set larger than the pore area ratio of an external layer region between an upper surface of the uppermost external layer of the internal conductors in the magnetic ceramic element and an upper surface thereof and the pore area ratio of an external layer region between a lower surface of the lowermost external layer of the internal conductors in the magnetic ceramic element and a lower surface thereof.

As the magnetic ceramic, a ceramic which includes NiCuZn ferrite as a primary component and which contains 0.1 to 0.5 percent by weight of a zinc borosilicate-based low softening point glass having a softening point of 500° C. to 700° C. is preferably used, and furthermore, a ceramic containing 0.2 to 0.4 percent by weight of the zinc borosilicate-based low softening point glass is more preferably used.

In addition, as the magnetic ceramic, a ceramic further containing 0.3 to 1.0 percent by weight of $SnO_2$ is preferably used, and furthermore, a ceramic containing 0.5 to 0.8 percent by weight of $SnO_2$ is more preferably used.

In addition, the average value of the diameters of pores relating to the pore area ratio of the magnetic ceramic is preferably in the range of 0.1 to 0.6 μm.

In addition, another embodiment of the present invention is directed a method for manufacturing a multilayer coil component. The method includes: a step of forming a magnetic ceramic element by firing a ceramic laminate in which magnetic ceramic layers and coil-forming internal conductors primarily composed of Ag are laminated to each other, the magnetic ceramic element including a spiral coil therein; and a step of allowing an acidic solution to permeate the magnetic ceramic element from a side surface thereof through a side gap portion which is a region between side portions of the internal conductors and the side surface of the magnetic ceramic element and to reach interfaces between the internal conductors and a magnetic ceramic located therearound so as to cut bonds between the internal conductors and the magnetic ceramic located therearound at the interfaces therebetween.

In addition, in another embodiment, a method for manufacturing a multilayer coil component of the present invention includes: a step of firing a ceramic laminate including magnetic ceramic green sheets laminated to each other and coil-forming internal conductor patterns primarily composed of Ag to form a magnetic ceramic element which includes a spiral coil therein, which has two side surfaces facing each other on which two end portions of the spiral coil are exposed, and which has a side gap portion having a pore area ratio of 6% to 20%, the side gap portion being a region between side portions of the internal conductors and a corresponding side surface of the magnetic ceramic element; a step of forming external electrodes on the two side surfaces of the magnetic ceramic element on which the two end portions of the spiral coil are exposed; and a step of performing plating on the surfaces of the external electrodes using an acidic plating solution.

In the multilayer coil component of the present invention, which is a multilayer coil component formed by firing a ceramic laminate in which magnetic ceramic layers and coil-forming internal conductors primarily composed of Ag are laminated to each other, since no voids are present at the interfaces between the internal conductors primarily composed of Ag and the magnetic ceramic located therearound, and the internal conductors are separated from the magnetic ceramic at the interfaces therebetween, without providing voids at the interfaces between the internal conductors and the magnetic ceramic (i.e., without thinning each internal conductor), stress relaxation can be performed. Hence, a highly reliable multilayer coil component can be provided in which the variation in characteristics is small, the direct current resistance can be reduced, and fracture of the internal conductors caused by the surge or the like can be suppressed or prevented.

In addition, in the case in which the pore area ratio of the magnetic ceramic in the side gap portion which is the region between the side portions of the internal conductors and the side surface of the magnetic ceramic element is set in the range of 6% to 20%, even when a ferrite-based ceramic capable of realizing a high strength and a high magnetic permeability as the entire multilayer coil component is used as the magnetic ceramic, an acidic solution is allowed to efficiently permeate the magnetic ceramic element, and without providing voids at the interfaces between the internal conductor layers and the magnetic ceramic, the bonds therebetween can be cut at the interfaces.

In addition, when the pore area ratio of the magnetic ceramic in the side gap portion is set large than the pore area ratio of the external layer region between the upper surface of the uppermost external layer of the internal conductors in the magnetic ceramic element and the upper surface thereof and the pore area ratio of the external layer region between the lower surface of the lowermost external layer of the internal conductors in the magnetic ceramic element and the lower surface thereof, an acidic solution is allowed to efficiently permeate the magnetic ceramic element through the side gap portion.

In addition, since the external layer region has a small pore area ratio, a multilayer coil component having a desired strength as a whole can be obtained.

In addition, since the ceramic which includes NiCuZn ferrite as a primary component and which contains 0.1 to 0.5 percent by weight of a zinc borosilicate-based low softening point glass having a softening point of 500° C. to 700° C. is used as the magnetic ceramic, even when the magnetic ceramic includes pores and has a low density, a multilayer inductor having a high strength and a high magnetic permeability as the entire multilayer coil component can be obtained.

In addition, since the zinc borosilicate-based low softening point glass is a crystallized glass, a sintered density of the magnetic ceramic can be stabilized. Furthermore, when the ceramic containing 0.2 to 0.4 percent by weight of the zinc borosilicate-based low softening point glass is used, the above effect can be further improved.

In addition, as the magnetic ceramic, when the ceramic is used which includes NiCuZn ferrite as a primary component, which contains a zinc borosilicate-based low softening point glass in the amount described above, and also which contains 0.3 to 1.0 percent by weight of $SnO_2$, a multilayer coil component can be obtained which has superior external stress resistance and direct current superposition characteristics.

In addition, when the ceramic containing 0.5 to 0.8 percent by weight of $SnO_2$ is used, the effect described above can be further ensured.

In addition, when $SnO_2$ is added, the magnetic permeability of the magnetic ceramic is decreased, and the strength is also decreased. However, when the zinc borosilicate-based low softening point crystallized glass is added, the decreases in magnetic permeability and strength can be compensated for.

In addition, according to the present invention, the average value of the diameters of pores relating to the pore area ratio of the magnetic ceramic is preferably set in the range of 0.1 to 0.6 μm, and the reasons for this are that when the pore diameter is less than 0.1 μm, an acidic solution is not likely to reach the interfaces between the internal conductors and the magnetic ceramic located therearound through the side gap portion, and when the pore diameter is more than 0.6 μm, the strength of the magnetic ceramic element is decreased.

In addition, in the method for manufacturing a multilayer coil component of the present invention, since an acidic solution is allowed to permeate the magnetic ceramic element from the side surface thereof through the side gap portion and to reach the interfaces between the internal conductors and the magnetic ceramic located therearound so as to cut the bonds between the internal conductors and the magnetic ceramic located therearound at the interfaces therebetween, even when the end surfaces of the magnetic ceramic element are covered with the external electrodes, the acidic solution can reliably reach the interfaces between the internal conductors and the magnetic ceramic located therearound by permeation, and hence stresses at the interfaces between the internal conductors and the magnetic ceramic located therearound can be reduced. As a result, a highly reliable multilayer coil component can be manufactured in which the variation in characteristics is small, the direct current resistance can be reduced, and fracture of the internal conductors caused by the surge or the like is not likely to occur.

In addition, according to the method for manufacturing a multilayer coil component of the present invention, the magnetic ceramic element is formed which includes a spiral coil therein, which has two side surfaces facing each other on which respective two end portions of the spiral coil are exposed, and which has a side gap portion having a pore area ratio of 6% to 20%, and after the external electrodes are formed on the two side surfaces of the magnetic ceramic element on which the two end portions of the spiral coil are exposed, plating is performed on the surfaces of the external electrodes using an acidic plating solution. Hence, even when the end surfaces of the magnetic ceramic element are covered with the external electrodes, the plating solution (acidic solution) can reliably reach the interfaces between the internal conductors and the magnetic ceramic located therearound by permeation through the porous side gap portion having a pore area ratio of 6% to 20% to cut the bonds between the internal conductors and the magnetic ceramic located therearound at the interfaces therebetween, so that the stress applied to the magnetic ceramic can be reduced.

In addition, since an acidic solution is used as the plating solution, and the plating solution is allowed to permeate the magnetic ceramic element simultaneously when plating is performed, a new step is not necessarily added to the existing steps, and hence a highly reliable multilayer coil component can be efficiently manufactured.

DESCRIPTION OF THE PREFERRED EMBODIMENTS

Hereinafter, with reference to examples of the present invention, the features of the present invention will be described in more detail.

Example 1

Figure 1:
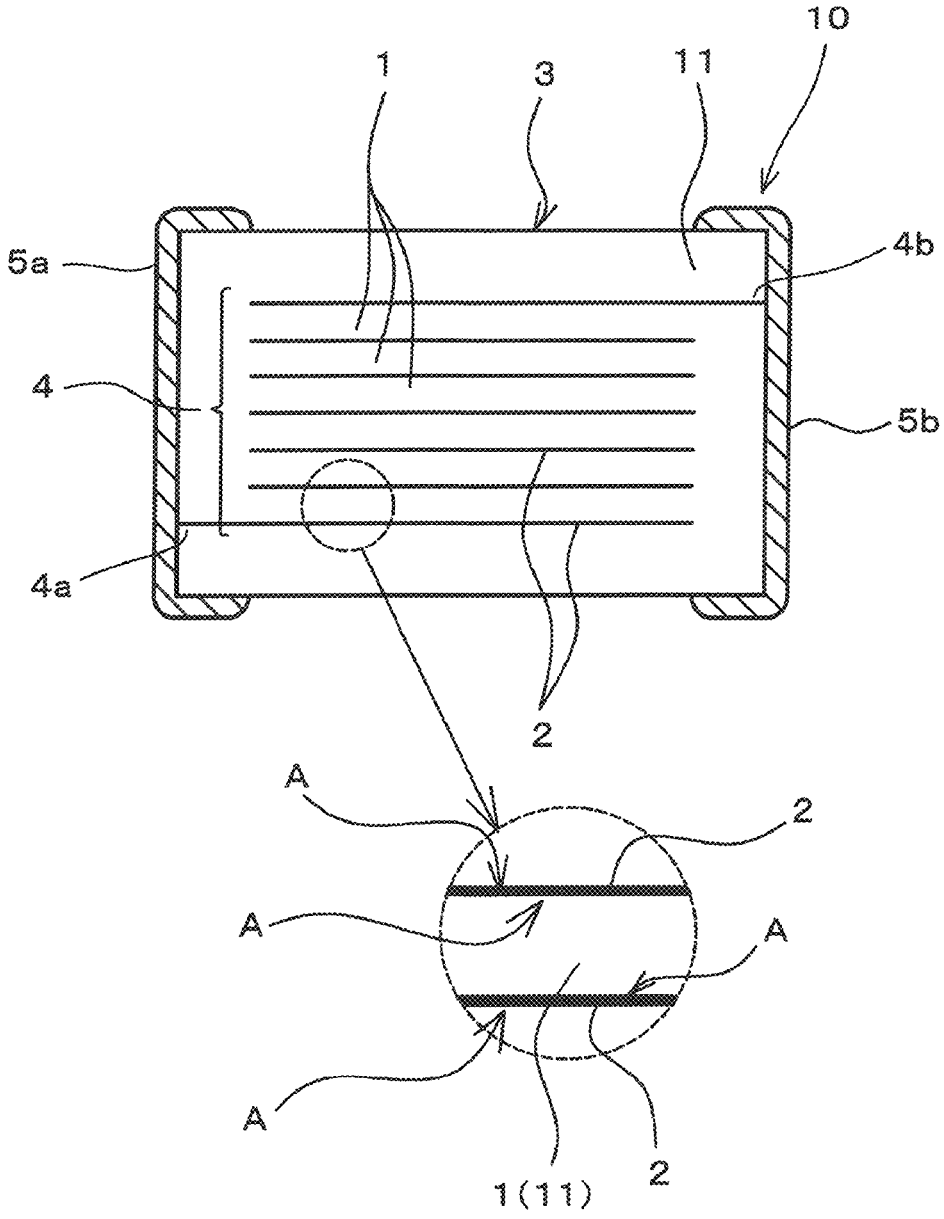
FIG. 1 is a front cross-sectional view showing the structure of a multilayer coil component according to an example (e.g., Example 1) of the present invention.
Figure 2:
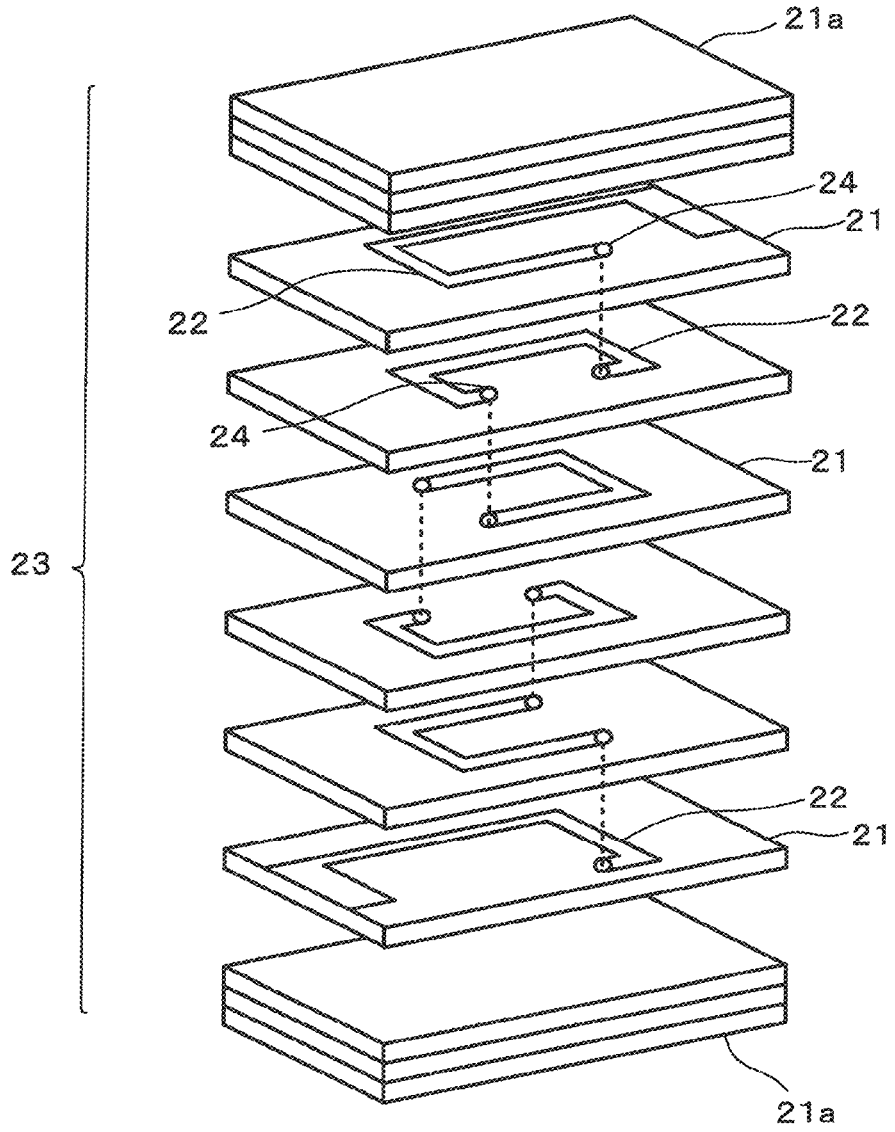
FIG. 2 is an exploded perspective view showing an important structure of the multilayer coil component according to Example 1 of the present invention.

FIG. 1 is a cross-sectional view showing the structure of a multilayer coil component (e.g., multilayer impedance element in Example 1) according to one example of the present invention, and FIG. 2 is an exploded perspective view showing a manufacturing method of the multilayer coil component. This multilayer coil component 10 is manufactured through a step of firing a laminate 3 in which coil-forming internal conductors 2 primarily composed of Ag and magnetic ceramic layers 1 are laminated to each other, and a magnetic ceramic element 3 includes a spiral coil 4 therein.

In addition, a pair of external electrodes 5a and 5b is provided at two end portions of the magnetic ceramic element 3 so as to be electrically connected to two end portions 4a and 4b of the spiral coil 4, respectively.

In addition, in this multilayer coil component 10, as schematically shown in FIG. 1, no voids are present at interfaces A between the internal conductors 2 and a magnetic ceramic 11 located therearound, and the internal conductors 2 and the magnetic ceramic 11 located therearound are in approximately close contact with each other. However, it is configured that the internal conductors 2 are separated from the magnetic ceramic 11 at the interfaces A therebetween.

In addition, in this multilayer coil component 10, since the internal conductor layers 2 are separated from the magnetic ceramic 11 at the interfaces A therebetween, voids are not necessarily provided at the interfaces A in order to cut bonds between the internal conductor layers 2 and the magnetic ceramic 11, and without thinning the internal conductors, the multilayer coil component 10 can be obtained in which the stress is reduced. Hence, a highly reliable multilayer coil component can be provided in which the variation in characteristics is small, the direct current resistance can be decreased, and fracture of the internal conductors caused by the surge or the like is not likely to occur.

Next, a method for manufacturing this multilayer coil component 10 will be described.

(1) A magnetic raw material was prepared in such a way that $Fe_2O_3$, ZnO, NiO, and CuO were weighed at a ratio of 48.0 mole percent, 29.5 mole percent, 14.5 mole percent, and 8.0 mole percent, and wet mixing was performed using a ball mill for 48 hours.

Subsequently, a slurry obtained by the wet mixing was dried by a spray dryer and was calcined at 700° C. for 2 hours.

The calcined material thus obtained was wet-pulverized by a ball mill for 16 hours, and a predetermined amount of a binder was mixed after the pulverization was finished, so that a ceramic slurry was obtained.

Next, this ceramic slurry was formed into sheets, so that ceramic green sheets each having a thickness of 25 μm were formed.

(2) Next, after via holes were formed in the ceramic green sheets at predetermined positions, a conductive paste for forming internal conductors was printed on the surfaces of the ceramic green sheets, so that coil patterns (i.e., internal conductor patterns) were formed.

As the conductive paste, a conductive paste containing 85 percent by weight of Ag was used in which a Ag powder containing 0.1 percent by weight or less of impurity elements, a varnish, and a solvent were blended together. As the conductive paste for forming coil patterns (i.e., internal conductor patterns), a paste containing Ag at a high content, such as a Ag content of 83 to 89 percent by weight, is preferably used as described above. In addition, when the amount of impurities is large, the internal conductor may be corroded by an acidic solution, and as a result, the direct current resistance may disadvantageously increase in some cases.

(3) Subsequently, as schematically shown in FIG. 2, after ceramic green sheets 21 on which internal conductor patterns (coil patterns) 22 were formed were laminated and pressure-bonded to each other, and ceramic green sheets 21a on which no coil patterns were formed were further laminated on an upper and a lower surface of the above laminate, pressure bonding was performed at 1,000 kgf/cm$^2$, so that a laminate (unfired magnetic ceramic element) 23 was obtained.

This unfired magnetic ceramic element 23 includes therein a laminate type spiral coil which is formed of the internal conductor patterns (coil patterns) 22 connected by via holes 24. In addition, the number of turns of the coil was set to 7.5.

(4) Subsequently, after a pressure-bonded block was cut into a predetermined size, debinding was performed, and sintering was performed by changing a firing temperature between 820° C. and 910° C., so that a magnetic ceramic element including the spiral coil therein was obtained.

The sintering shrinkage rate of the magnetic ceramic (ferrite) in firing is 13% to 20%, and that of the internal conductor is 8%. In addition, in a firing temperature range of 820 to 910° C., the sintering shrinkage rate of the internal conductor is approximately constant.

Figure 3:
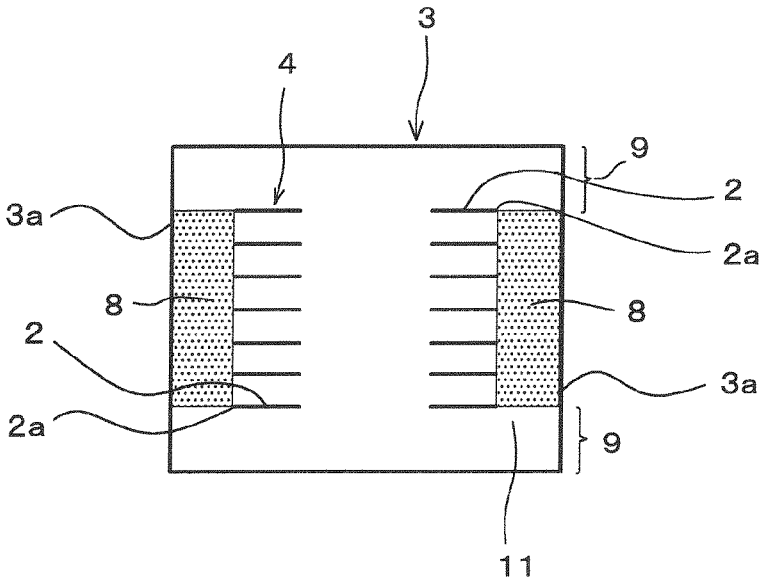
FIG. 3 is a side cross-sectional view showing the structure of the multilayer coil component according to Example 1 of the present invention.

In addition, when it is assumed that the shrinkage rate of the magnetic ceramic (ferrite) is larger than that of the internal conductor which is the conductor pattern, that the sintering shrinkage rate of the internal conductor which is the conductor pattern is in the range of 0% to 15%, and that firing is performed at a predetermined temperature, the distribution of a pore area ratio is generated in the magnetic ceramic element. As shown in FIG. 3, the pore area ratio of a side gap portion 8 which is a region between side portions 2a of the internal conductors 2 and a corresponding side surface 3a of the magnetic ceramic element 3 is larger than the pore area ratio of an external layer region 9 between an upper surface of the uppermost external layer of the internal conductors 2 in the magnetic ceramic element 3 and an upper surface thereof and than the pore area ratio of an external layer region 9 between a lower surface of the lowermost external layer of the internal conductors 2 in the magnetic ceramic element 3 and a lower surface thereof. That is, the external layer region 9 is more densely sintered, and the pores are more frequently distributed in the side gap portion 8.

As described above, the reason the external layer region 9 is more densely fired and the pores are more frequently distributed in the side gap portion 8 is that when the sintering shrinkage rate of the internal conductor 2 is decreased by a predetermined rate as compared to that of the magnetic ceramic 11, the difference in sintering shrinkage rate between the internal conductor 2 and the magnetic ceramic 11 is generated, and the internal conductor 2 suppresses the sintering shrinkage of the magnetic ceramic 11.

In addition, the sintering shrinkage rate of the internal conductor can be controlled, for example, by appropriately selecting the content of the conductive component (Ag powder) in the conductive paste for forming internal conductors and the types of varnish and solvent contained in the conductive paste.

When the sintering shrinkage rate of the internal conductor is less than 0%, the internal conductor may not shrink in firing or may expand larger than that before firing, and it is not preferable since structural defects may occur and/or a chip shape may be adversely influenced.

In addition, when the sintering shrinkage rate of the internal conductor is 15% or more, the distribution of the pore ratio is not generated in the magnetic ceramic element, and while the density of the external layer region is increased to a predetermined value, a Ni plating solution cannot permeate the magnetic ceramic element from the side gap.

Hence, the sintering shrinkage rate of the internal conductor is preferably set in the range of 0% to 15% and is more preferably set in the range of 5% to 11%.

The measurement of the sintering shrinkage rate of the magnetic ceramic was performed in such a way that after ceramic green sheets were laminated to each other and were pressure bonded under the same pressure condition as that when a multilayer coil component was actually manufactured, the laminate thus obtained was cut into a predetermined size, followed by firing, and the sintering shrinkage rate was measured in the lamination direction by a thermal mechanical analyzer (TMA).

In addition, the measurement of the sintering shrinkage rate of the internal conductor was performed by the following method.

First, after the conductive paste for forming internal conductors was thinly applied to a glass plate and was then dried, the dried material was scraped off and was pulverized using a mortar into a powder. Subsequently, after the powder thus obtained was received in a mold and was processed by uniaxial press molding under the same pressure condition as that when a multilayer coil component was actually manufactured, cutting was performed to obtain a predetermined size, and firing was then performed. Next, the sintering shrinkage rate was measured in a direction along the press direction by a TMA.

(5) Subsequently, after a conductive paste for forming external electrodes was applied to two end portions of the magnetic ceramic element (sintered element) 3 including the spiral coil 4 therein and was dried, firing was performed at 750° C., so that the external electrodes 5a and 5b (see FIG. 1) were formed.

Incidentally, as the conductive paste for forming external electrodes, a conductive paste was used in which a Ag powder having an average particle diameter of 0.8 μm, a B—Si—K-based glass frit having superior plating resistance and an average particle diameter of 1.5 μm, a varnish, and a solvent were blended together. In addition, the external electrodes formed by firing this conductive paste were dense so as not to be eroded by a plating solution in the following plating step.

(6) Subsequently, the external electrodes 5a and 5b thus formed were processed by Ni plating and Sn plating, so that plating films each having a Ni plating film layer as a lower layer and a Sn plating film layer as an upper layer were formed. Accordingly, as shown in FIG. 1, the multilayer coil component (multilayer impedance element) 10 having the structure in which the magnetic ceramic element 3 includes the spiral coil 4 therein is obtained.

In addition, in the above plating step, as a Ni plating solution, an acidic solution having a pH of 4 was used which contained nickel sulfate, nickel chloride, and boric acid at a ratio of approximately 300 g/L, approximately 50 g/L, and approximately 35 g/L.

In addition, as a Sn plating solution, an acidic solution having a pH of 5 was used which contained tin sulfate, ammonium hydrogen citrate, and ammonium sulfate at a ratio of approximately 70 g/L, approximately 100 g/L, and approximately 100 g/L.

Evaluation Characteristics

For the multilayer coil component formed as described above, measurement of the impedance by the following method and measurement of the bending strength by a three-point bending test were performed.

In addition, the pore area ratio of the magnetic ceramic element before the external electrodes were processed by plating in the above step (6) was measured by the following method.

(a) Measurement of Impedance

Measurement of the impedance was performed on 50 samples using an impedance analyzer (HP4291A manufactured by Hewlett-Packard Co.), and the average value was then obtained (n=50 pcs.).

(b) Measurement of Bending Strength

Measurement was performed on 50 samples in accordance with EIAJ-ET-7403, and the strength at a fracture probability of 1% of the Weibull plot was regarded as the bending strength (n=50 pcs.).

(c) Measurement of Pore Area Ratio

After a cross-sectional surface (hereinafter referred to as "W-T surface") defined by the width direction and the thickness direction of the magnetic ceramic element before plating was processed by mirror polishing and was then processed by focused ion beam processing (FIB processing), the surface thus processed was observed by a scanning electron microscope (SEM), so that the pore area ratio of the sintered magnetic ceramic was measured.

In particular, the pore area ratio was measured using an image processing software "WINROOF" manufactured by Mitani Corporation. The detailed measurement method is as follows.

FIB apparatus: FIB200TEM manufactured by FEI

FE-SEM (scanning electron microscope): JSM-7500FA manufactured by JEOL Ltd.

WinROOF (image processing software): Ver. 5.6 manufactured by Mitani Corporation Focused Ion Beam processing (FIB processing)

Figure 4:
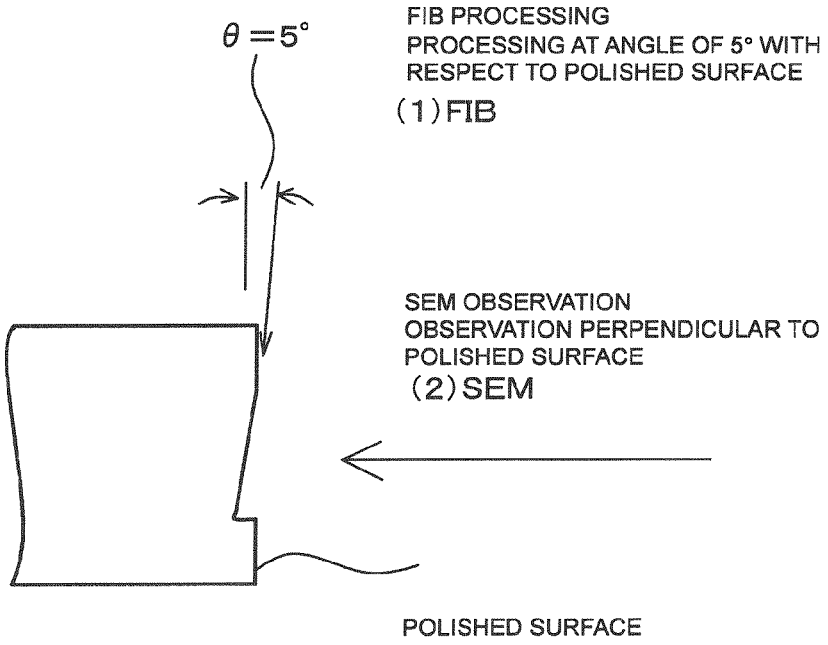
FIG. 4 is a view illustrating a measurement method of a pore area ratio of a multilayer coil component which is performed in Example 1 of the present invention and in a comparative example.

As shown in FIG. 4, FIB processing was performed at an incident angle of 5° with respect to a polished surface of a sample which was mirror-polished by the above method.

Observation by Scanning Electron Microscope (SEM) SEM observation was performed under the following conditions.

Acceleration voltage: 15 kV

Sample inclination: 0°

Signal: Secondary electrons

Coating: Pt

Magnification: 5,000 times

Calculation of Pore Area Ratio

The pore area ratio was obtained by the following method.

a) The measurement range is determined. When the range is too small, errors caused by measurement points are generated.

(In this Example, the Range was Set to 22.85 μm by 9.44 μm.)

b) When it is difficult to discriminate between the magnetic ceramic and pores, the brightness and the contrast are adjusted. C) The binary image processing is performed so as to extract only pores. When "color extraction" by the image processing software "WinROOF" is not perfect, manual operation is additionally performed.

d) When images other than pores are extracted, the images other than pores are eliminated.

e) The total area, the count, the pore area ratio, and the area of the measurement range are measured by "Measurement of Total Area/Count" of the image processing software.

The pore area ratio of the present invention is a value measured as described above.

Table 1 shows the pore area ratios of the side gap portion and the external layer region, the impedance (|Z|) value, and the bending strength, which were measured as described above. In addition, Table 1 also shows the firing temperature, the presence or absence of voids at the interfaces between the magnetic ceramic and the internal conductors which is judged by SEM observation of an FIB-processed surface, and the presence or absence of separations at the interfaces between the magnetic ceramic and the internal conductors when the multilayer coil component is fractured.

TABLE 1

| Sample No. | Firing temperature (° C.) | Pore area ratio of side gap portion (%) | Pore area ratio of external layer region (%) | Impedance \|Z\| (Ω) 100 MHz | Bending strength (N) | Presence of voids at interfaces | Presence of separations at interfaces |
|---|---|---|---|---|---|---|---|
| 1 | 820 | 26 | 20 | 544 | 13 | NO | YES |
| 2 | 835 | 20 | 15 | 595 | 18 | NO | YES |
| 3 | 850 | 16 | 12 | 637 | 19 | NO | YES |
| 4 | 870 | 11 | 8 | 659 | 20 | NO | YES |
| 5 | 885 | 8 | 5 | 660 | 21 | NO | YES |
| 6 | 890 | 6 | 4 | 626 | 21 | NO | YES |
| 7 | 910 | 2 | 1 | 373 | 22 | NO | NO |

In Table 1, the samples (i.e., samples of Sample Nos. 1 to 6) in each of which no voids are recognized at the interfaces between the magnetic ceramic and the internal conductors by the SEM observation of the FIB processed surface and in each of which the separations are recognized at the interfaces between the magnetic ceramic and the internal conductors when the multilayer coil component is fractured are samples which satisfy the requirement of the present invention in which "no voids are present at the interfaces between the internal electrodes primarily composed of Ag and the magnetic ceramic located therearound, and the internal conductors and the magnetic ceramic are separated from each other at the interfaces therebetween", and Sample No. 7 is a sample in which the internal conductors and the magnetic ceramic are bonded to each other at the interfaces therebetween and is a sample which does not satisfy the requirement of the present invention.

As described above, as for the sintering shrinkage rate of the magnetic ceramic (ferrite) and that of the internal conductor in firing, the magnetic ceramic has 13% to 20%, and on the other hand, the internal conductor has 8%; hence, since the sintering shrinkage rate of the internal conductor is lower than that of the ferrite, at the stage at which the firing is finished, the internal conductors and the magnetic ceramic are tightly bonded to each other at the interfaces therebetween.

However, when a sample in which the internal conductors and the magnetic ceramic are tightly bonded to each other at the interfaces therebetween is processed, for example, by Ni plating, and when the pore area ratio of the side gap portion is large to a certain extent, a Ni plating solution permeates the inside of the magnetic ceramic element (multilayer coil component) from pores in the regions which are not covered with the external electrodes at the same time when the plating is performed and reaches the interfaces between the internal conductors and the magnetic ceramic, so that cutting of the bonds between the internal conductors and the magnetic ceramic at the interfaces therebetween is performed.

On the other hand, when the pore area ratio of the side gap portion is small, the plating solution cannot permeate the inside, and hence the bonds between the internal conductors and the magnetic ceramic at the interfaces cannot be cut.

In the case of the sample of sample No. 7 shown in Table 1 in which the pore area ratio of the side gap portion is as low as 2%, and in which no separations between the magnetic ceramic and the internal conductors are recognized at the interfaces when the multilayer coil component is fractured, since the internal conductors and the magnetic ceramic are bonded to each other at the interfaces therebetween even after the plating step is performed, and a stress is applied to the magnetic ceramic due to the sintering shrinkage of the internal conductors, the impedance is considerably decreased.

On the other hand, in the case of the samples of sample Nos. 1 to 6 in which the pore area ratio of the side gap portion is 6% or more, since the plating solution permeates the inside of the magnetic ceramic element, and the bonds between the internal conductors and the magnetic ceramic at the interfaces therebetween are sufficiently cut, it is found that a multilayer coil component having superior characteristics can be obtained in which the decrease in impedance is small.

In addition, in the case of the samples of sample Nos. 1 to 6, although no voids are recognized at the interfaces between the magnetic ceramic and the internal conductors by the SEM observation of the FIB processed surface, when the multilayer coil component is fractured, separations are recognized between the magnetic ceramic and the internal conductors at the interfaces therebetween. From the results described above, it is found that since a Ni plating solution permeates the inside of the magnetic ceramic element (multilayer coil component) from pores in the regions which are not covered with the external electrodes and reaches the interfaces between the internal conductors and the magnetic ceramic, the bonds between the internal conductors and the magnetic ceramic at the interfaces therebetween are cut.

In addition, in the case of the sample of sample No. 1, since the pore area ratio is as high as 26%, although the decrease in impedance is small, the decrease in bending strength is recognized.

Hence, in order to ensure a high bending strength while the decrease in impedance is suppressed, as in sample Nos. 2 to 6, the pore area ratio of the side gap portion is preferably set in the range of 6 to 20.

In addition, as in sample Nos. 3 to 5, when the pore area ratio is set to 8% to 16%, it is found that more preferably, the impedance and the bending strength are further stabilized.

Figure 5:
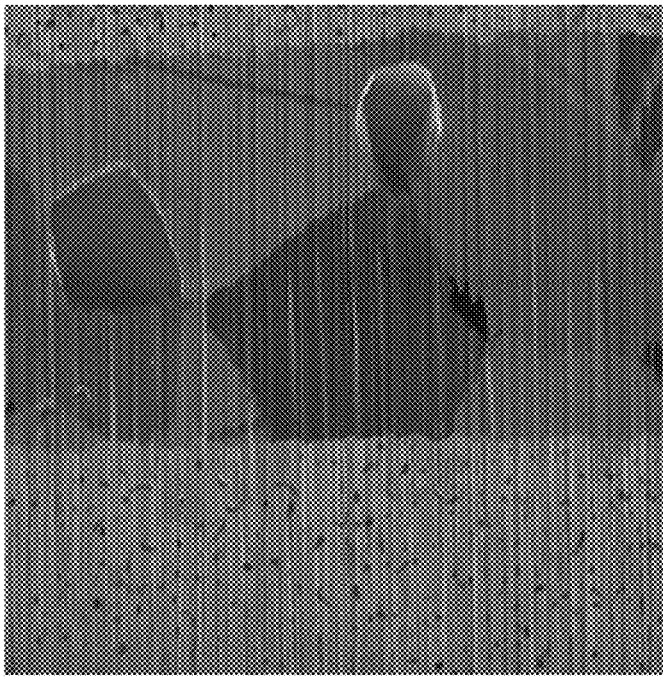
FIG. 5 is a view showing a SIM image of a surface (W-T surface) processed by FIB after a cross section of the multilayer coil component (e.g., sample of Sample No. 3 in Table 1) according to Example 1 of the present invention.

FIG. 5 shows a SIM image of a surface (W-T surface) processed by FIB after a cross section of the multilayer coil component (sample of sample No. 3 shown in Table 1) according to the example of the present invention is mirror-polished.

This SIM image was obtained in such a way that after the W-T surface of the multilayer coil component processed by plating was mirror-polished and was then processed by FIB, observation was performed by a SIM at a magnification of 5,000, and it is found that no voids are recognized at the interfaces between the magnetic ceramic and the internal conductors.

Figure 6:
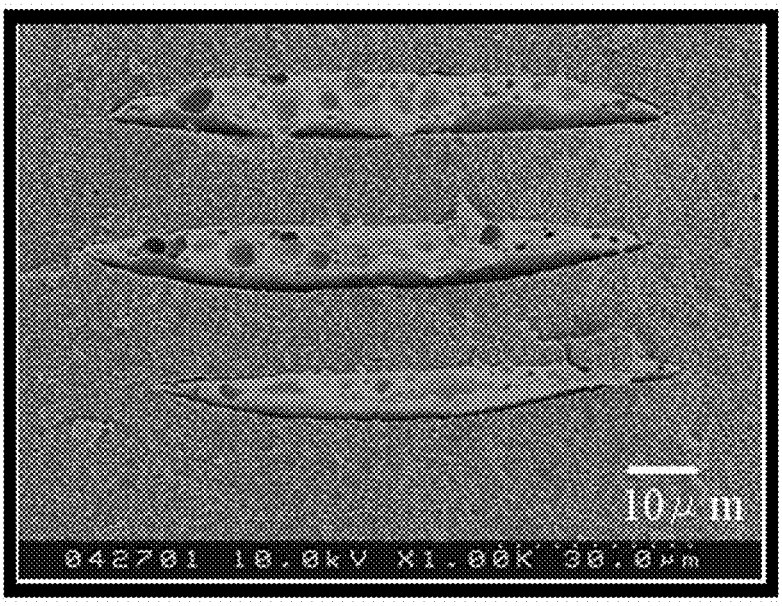
FIG. 6 is a view showing a SEM image of a fracture surface of the multilayer coil component (sample of Sample No. 3 in Table 1) according to Example 1 of the present invention which is obtained by a three-point bending test.

In addition, FIG. 6 shows a SEM image of a fracture surface of the multilayer coil component (i.e., sample of sample No. 3 shown in Table 1) according to the example which is obtained by a three-point bending test.

As apparent from FIG. 6, according to the SEM observation of the fracture surface, spaces are recognized, and since the internal conductors and the magnetic ceramic are separated from each other at the interfaces therebetween, it is believed that when the internal conductor extends by fracture and is pulled to the front side with respect to the plane of the figure, the spaces are formed. In addition, also when the sample is fractured by a nipper, spaces similar to those described above are recognized.

Example 2

In Example 2, an example of a multilayer coil component formed using a magnetic ceramic added with a glass will be described.

A magnetic raw material was prepared in such a way that $Fe_2O_2$, ZnO, NiO, and CuO were weighed at a ratio of 48.0 mole percent, 29.5 mole percent, 14.5 mole percent, and 8.0 mole percent, and wet mixing was performed using a ball mill for 48 hours to form a slurry.

Subsequently, this slurry was dried by a spray dryer and was calcined at 700° C. for 2 hours to obtain a calcined material.

Next, after a zinc borosilicate-based low softening point crystallized glass was added to this calcined material at a ratio of 0 to 0.6 percent by weight and was then wet-pulverized by a ball mill for 16 hours, a predetermined amount of a binder was mixed, so that a ceramic slurry was obtained. In addition, the zinc borosilicate-based low softening point crystallized glass may be added before the calcination.

The zinc borosilicate-based crystallized glass thus added was a glass having a composition containing 12 percent by weight of $SiO_2$, 60 percent by weight of ZnO, and 28 percent by weight of $B_2O_3$ and was a glass having a softening point of 580° C., a crystallization temperature of 690° C., and a particle diameter of 1.5 μm.

In addition, as the glass composition, additives, such as BaO, $K_2O$, CaO, $Na_2O$, $Al_2O_2$, $SnO_2$, SrO, MgO, and the like, may be contained in the above basic composition.

Subsequently, this ceramic slurry was formed into sheets, so that ceramic green sheets each having a thickness of 25 μm were obtained.

Next, by the same method as that including the steps (2) to (4) of Example 1, an unfired laminate (magnetic ceramic element) including a laminate type spiral coil therein was formed.

In addition, this laminate was sintered by adjusting the firing temperature so as to obtain a pore area ratio of the side gap portion of 11%.

Next, by the same method and conditions as those of Example 1, the impedance and the bending strength by a three-point bending test were measured.

In Table 2, the values of impedances (|Z|) and the values of bending strengths of samples which used magnetic ceramics containing different amounts of the glass are shown.

TABLE 2

| Sample No. | Glass addition amount (percent by weight) | Impedance \|Z\| (Ω) 100 MHz | Bending strength (N) |
|---|---|---|---|
| 8 | 0 | 659 | 20 |
| 9 | 0.05 | 661 | 21 |
| 10 | 0.10 | 665 | 24 |
| 11 | 0.20 | 679 | 25 |
| 12 | 0.30 | 681 | 26 |
| 13 | 0.40 | 676 | 26 |
| 14 | 0.50 | 665 | 25 |
| 15 | 0.60 | 645 | 24 |

As shown in Table 2, by addition of the zinc borosilicate-based crystallized glass, even having a predetermined pore area ratio and a low density, a magnetic ceramic can be obtained which has a high mechanical strength and a high magnetic permeability. Accordingly, without decreasing the impedance, a multilayer coil component having a high bending strength can be obtained.

In addition, the addition amount of the zinc borosilicate-based crystallized glass is preferably set in the range of 0.1 to 0.5 percent by weight and is more preferably set in the range of 0.2 to 0.4 percent by weight.

In addition, the composition of the zinc borosilicate-based crystallized glass used in Example 2 was changed, and a zinc boro silicate-based crystallized glass having a softening point of 400° C. to 770° C. was formed. In addition, a multilayer coil component was formed by the same method and conditions as those of Example 1 except that the addition amount of this zinc borosilicate-based crystallized glass was set to 0.3 percent by weight, and the impedance of the multilayer coil component thus obtained was measured. The results are shown in FIG. 7.

Figure 7:
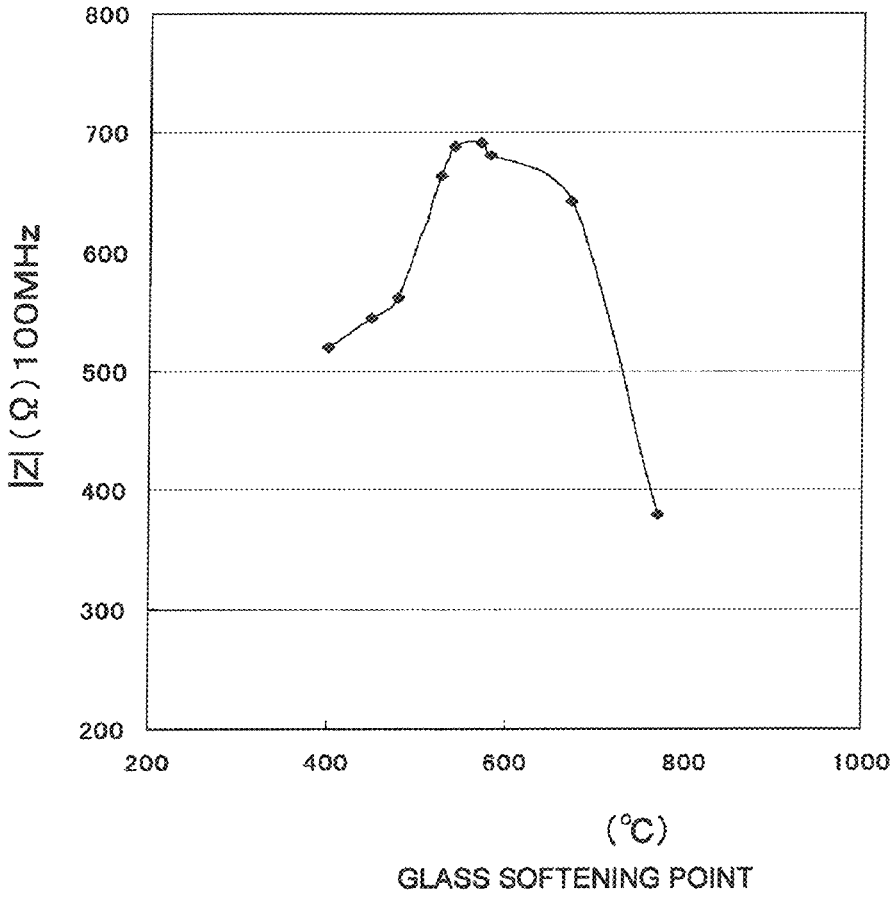
FIG. 7 is a view showing the relationship between the impedance and the softening point of a zinc borosilicate-based low softening point glass added to a magnetic ceramic.

As can be seen from FIG. 7, when the softening point of the glass to be used is set in the range of 500° C. to 700° C., a high impedance (|Z|) value can be obtained.

When the glass softening point is less than 500° C., it is not preferable since the sintering of the magnetic ceramic is disturbed due to a decrease in fluidity and the magnetic permeability is decreased due to evaporation of the glass.

In addition, when the glass softening point is more than 700° C., it is also not preferable since the sintering of the magnetic ceramic is disturbed, the magnetic permeability is decreased, and the impedance is decreased.

In addition, in the present invention, a method for controlling the pore area ratio of the side gap is not particularly limited, and for example, when the following methods are used alone or in combination, the pore area ratio of the side gap can be controlled. That is, for example, there may be mentioned:

a method (1) for adjusting the difference in sintering shrinkage rate between the magnetic ceramic and the internal conductor within the range of 5% to 20%;

a method (2) for adjusting the thickness of the internal conductor to the thickness of a magnetic ceramic sheet (such as 10 to 50 μm), for example, within the range of 5 to 50 μm;

a method (3) for adjusting the particle diameter of a ceramic forming the magnetic ceramic sheet, for example, within the range of 0.5 to 5 μm;

a method (4) for adjusting the content of a binder of the magnetic ceramic sheet, for example, within the range of 8 to 15 percent by weight; and a method (5) performed using the above methods (1) to (4) in combination.

Example 3

In Example 3, an example of a multilayer coil component formed using a magnetic ceramic in which $SnO_2$ was added to NiCuZn ferrite will be described.

After $Fe_2O_3$, ZnO, NiO, and CuO were weighed at a ratio of 48.0 mole percent, 29.5 mole percent, 14.5 mole percent, and 8.0 mole percent, SnO was weighed at a ratio of 0 to 1.25 percent by weight to the primary components (that is, at a ratio of 0 to 1.2 percent by weight of the total weight) to form a magnetic raw material, and wet mixing was performed using a ball mill for 48 hours, so that a slurry was formed.

Subsequently, this slurry was dried by a spray dryer and was calcined at 700° C. for 2 hours to obtain a calcined material.

After 0.3 percent by weight of a zinc borosilicate-based low softening point crystallized glass was added to this calcined material and was then wet-pulverized by a ball mill for 16 hours, a predetermined amount of a binder was added and mixed, so that a ceramic slurry was obtained.

Next, by the same method as that of Example 2, an unfired laminate (magnetic ceramic element) including a laminate type spiral coil therein was formed.

In addition, this laminate was sintered by adjusting the firing temperature so as to obtain a pore area ratio of the side gap portion of 11%.

Next, in a manner similar to that of Example 2, the impedance and the bending strength by a three-point bending test were measured. In addition, after a heat shock test between −55° C. and 125° C. was performed 2,000 cycles for 50 elements per each sample, the rates of change in impedance before and after the test were measured, and the maximum value thereof was obtained.

Table 3 shows the values of impedances UZI), the bending strengths, and the maximum values of the rates of change in impedance UZI) before and after the heat shock test of the samples in which the $SnO_2$ addition amounts were changed.

TABLE 3

| Sample No. | $SnO_2$ addition amount (percent by weight) | Impedance \|Z\| (Ω) 100 MHz | Bending strength (N) | Maximum rate of change in \|Z\| by heat shock test (%) |
|---|---|---|---|---|
| 14 | 0 | 681 | 26 | 14 |
| 15 | 0.30 | 669 | 25 | 11 |
| 16 | 0.50 | 660 | 25 | 7 |
| 17 | 0.75 | 655 | 25 | 5 |
| 18 | 1.00 | 641 | 24 | 4 |
| 19 | 1.25 | 597 | 22 | 4 |

As can be seen from Table 3, as the $SnO_2$ addition amount is increased, the rate of change in impedance before and after the heat shock test is decreased.

However, since the bending strength and the impedance are also decreased, the $SnO_2$ addition amount is preferably set in the range of 0.3 to 1.0 percent by weight.

Furthermore, as in the case of Sample Nos. 16 and 17, when the $SnO_2$ addition amount is set in the range of 0.5 to 0.8 percent by weight, it is particularly preferable since a multilayer coil component having more stable characteristics can be obtained.

In each of the above examples, although the case in which manufacturing was performed by a so-called sheet lamination method including a step of laminating ceramic green sheets was described by way of example, manufacturing may also be performed by a so-called sequential printing method in which after a magnetic ceramic slurry and a conductive paste for forming internal conductors are prepared, printing is performed to form a laminate having the structure as described in each of the above examples.

Furthermore, manufacturing may also be performed by a so-called sequential transfer method in which a laminate having the structure as shown in each of the above examples is formed. In this method, for example, after a ceramic layer formed by printing (applying) a ceramic slurry on a carrier film is transferred onto a table, an electrode paste layer formed by printing (applying) an electrode paste on a carrier film is transferred onto the transferred ceramic layer, and the above steps are repeatedly performed.

The multilayer coil component of the present invention may also be manufactured by another method, and a concrete manufacturing method is not specifically limited.

In addition, the present invention may also be applied, for example, to a multilayer inductor having an open magnetic circuit structure which partly contains a non-magnetic ceramic.

In addition, in each of the above examples, an acidic solution was used as a plating solution for plating the external electrodes, and the multilayer coil component was immersed in this plating solution to cut the bonds between the internal conductors and the magnetic ceramic located therearound at the interfaces therebetween; however, for example, at the stage before the plating step is performed, the multilayer coil component may be immersed in a $NiCl_2$ solution (pH of 3.8 to 5.4). In addition, another acidic solution may also used.

In addition, in each of the above examples, although the case in which the multilayer coil components were formed one by one (one-by-one production case) was described by way of example, when mass production is performed, manufacturing may be performed by a so-called multi-production method in which, for example, after many coil conductor patterns are printed on surfaces of mother ceramic green sheets, and the mother ceramic green sheets are laminated and pressure-bonded to each other to form an unfired laminate block, many multilayer coil components are simultaneously manufactured through a step in which the laminate block is cut in accordance with the arrangement of the coil conductor patterns to obtain laminates for the multilayer coil components.

In addition, in each of the above examples, although the case in which the multilayer coil component was a multilayer impedance element was described by way of example, the present invention may also be applied to various multilayer coil components, such as a multilayer inductor and a multilayer transformer.

Furthermore, the other points of the present invention are also not limited to the examples described above, and the thickness of the internal conductor, the thickness of the magnetic ceramic layer, the dimension of the product, the firing conditions of the laminate (magnetic ceramic element), and the like may be variously changed and modified within the scope of the present invention.

As described above, according to the present invention, a highly reliable multilayer coil component can be provided in which without forming voids as in the past between the magnetic ceramic layers and the internal conductor layers which form the multilayer coil component, an internal stress problem generated due to the difference in sintering shrinkage behavior and coefficient of thermal expansion between the magnetic ceramic layers and the internal conductor layers can be reduced; the direct current resistance is low; and fracture of the internal conductors caused by the surge or the like is not likely to occur.

Hence, the present invention may be widely applied to various multilayer coil components, such as a multilayer impedance element and a multilayer inductor, each having the structure in which a coil is provided in a magnetic ceramic.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer coil component comprising:

a magnetic ceramic element formed from a ceramic laminate having magnetic ceramic layers laminated to each other, coil-forming internal conductors primarily composed of Ag, the internal conductors being interlayer-connected to each other to form a spiral coil, and a magnetic ceramic disposed around and between the internal conductors without voids present at interfaces between the internal conductors and the magnetic ceramic located therearound, and the internal conductors are separated from the magnetic ceramic at the interfaces therebetween.

2. The multilayer coil component according to claim 1, further comprising a side gap portion, and wherein each of the internal conductors has a side portion, and in the side gap portion between side portions of the internal conductors and a corresponding side surface of the magnetic ceramic element, a pore area ratio of the magnetic ceramic is in the range of 6% to 20%.

3. The multilayer coil component according to claim 1, further comprising a side gap portion, wherein a pore area ratio of the magnetic ceramic of the side gap portion is larger than a pore area ratio of an external layer region between an upper surface of the uppermost external layer of the internal conductors in the magnetic ceramic element and an upper surface thereof and a pore area ratio of an external layer region between a lower surface of the lowermost external layer of the internal conductors in the magnetic ceramic element and a lower surface thereof.

4. The multilayer coil component according to claim 1, wherein the magnetic ceramic includes NiCuZn ferrite as a primary component and contains 0.1 to 0.5 percent by weight of a zinc borosilicate-based low softening point glass having a softening point of 500° C. to 700° C.

5. The multilayer coil component according to claim 1, wherein the magnetic ceramic includes NiCuZn ferrite as a primary component and contains 0.2 to 0.4 percent by weight of a zinc borosilicate-based low softening point glass having a softening point of 500° C. to 700° C.

6. The multilayer coil component according to claim 1, wherein the magnetic ceramic includes NiCuZn ferrite as a primary component and contains 0.3 to 1.0 percent by weight of $SnO_2$ as well as 0.1 to 0.5 percent by weight of a zinc borosilicate-based low softening point glass having a softening point of 500° C. to 700° C.

7. The multilayer coil component according to claim 1, wherein the magnetic ceramic includes NiCuZn ferrite as a primary component and contains 0.5 to 0.8 percent by weight of $SnO_2$ as well as 0.1 to 0.5 percent by weight of a zinc borosilicate-based low softening point glass having a softening point of 500° C. to 700° C.

8. The multilayer coil component according to claim 2, wherein the average value of the diameters of pores relating to the pore area ratio of the magnetic ceramic is in the range of 0.1 to 0.6 μm.

9. The multilayer coil component according to claim 3, wherein an average value of the diameters of pores relating to the pore area ratio of the magnetic ceramic is in the range of 0.1 to 0.6 μm.

10. The multilayer coil component according to claim 4, wherein an average value of the diameters of pores relating to the pore area ratio of the magnetic ceramic is in the range of 0.1 to 0.6 μm.

11. The multilayer coil component according to claim 5, wherein an average value of the diameters of pores relating to the pore area ratio of the magnetic ceramic is in the range of 0.1 to 0.6 μm.

12. The multilayer coil component according to claim 6, wherein an average value of the diameters of pores relating to the pore area ratio of the magnetic ceramic is in the range of 0.1 to 0.6 μm.

13. The multilayer coil component according to claim 7, wherein an average value of the diameters of pores relating to the pore area ratio of the magnetic ceramic is in the range of 0.1 to 0.6 μm.

*14. A multilayer coil component comprising:*

*a magnetic ceramic element formed from a ceramic laminate having magnetic ceramic layers laminated to each other,*

*coil-forming internal conductors primarily composed of Ag, the internal conductors being interlayer-connected to each other to form a spiral coil, and*

*side gap portion,*

*wherein each of the internal conductors has a side portion, and in the side gap portion between side portions of the internal conductors and a corresponding side surface of the magnetic ceramic element, a pore area ratio of the magnetic ceramic is in the range of 6% to 20%, and*

*the internal conductors are separated from the magnetic ceramic at interfaces therebetween.*

*15. The multilayer coil component according to claim 14, further comprising a side gap portion,*

*wherein a pore area ratio of the magnetic ceramic of the side gap portion is larger than a pore area ratio of an external layer region between an upper surface of the uppermost external layer of the internal conductors in the magnetic ceramic element and an upper surface thereof and a pore area ratio of an external layer region between a lower surface of the lowermost external layer of the internal conductors in the magnetic ceramic element and a lower surface thereof.*

*16. The multilayer coil component according to claim 14, wherein the magnetic ceramic includes NiCuZn ferrite as a primary component and contains 0.1 to 0.5 percent by weight of a zinc borosilicate-based low softening point glass having a softening point of 500° C. to 700° C.*

*17. The multilayer coil component according to claim 14, wherein the magnetic ceramic includes NiCuZn ferrite as a primary component and contains 0.3 to 1.0 percent by weight of $SnO_2$ as well as 0.1 to 0.5 percent by weight of a zinc borosilicate-based low softening point glass having a softening point of 500° C. to 700° C.*

*18. The multilayer coil component according to claim 14, wherein the average value of the diameters of pores relating to the pore area ratio of the magnetic ceramic is in the range of 0.1 to 0.6 μm.*

*19. The multilayer coil component according to claim 14, further comprising external electrodes formed on two side surfaces of the magnetic ceramic element on which two end portions of the spiral coil are exposed, and*

*plating films are formed on the external electrodes.*

* * * * *